(12) United States Patent
Konrad

(10) Patent No.: US 6,633,972 B2
(45) Date of Patent: Oct. 14, 2003

(54) METHOD AND APPARATUS FOR UTILIZING STATIC QUEUES IN PROCESSOR STAGING

(75) Inventor: Victor Konrad, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 09/878,062

(22) Filed: Jun. 7, 2001

(65) Prior Publication Data

US 2002/0188775 A1 Dec. 12, 2002

(51) Int. Cl.[7] .............................................. G06F 13/00
(52) U.S. Cl. ........................... 712/219; 710/29; 710/54; 711/169; 713/500
(58) Field of Search ............................... 710/29, 51–61; 711/169; 712/200–204, 214–219; 713/400–600

(56) References Cited

U.S. PATENT DOCUMENTS

| | | | | |
|---|---|---|---|---|
| 5,113,395 A | * | 5/1992 | Murakami et al. .......... 370/505 |
| 5,247,647 A | * | 9/1993 | Brown et al. .................. 714/1 |
| 5,325,495 A | * | 6/1994 | McLellan .................... 712/219 |
| 5,475,644 A | * | 12/1995 | Chauvel et al. ............. 365/221 |
| 5,488,730 A | * | 1/1996 | Brown et al. ................. 712/41 |
| 5,790,776 A | * | 8/1998 | Sonnier et al. ............... 714/10 |
| 5,944,818 A | * | 8/1999 | Baxter et al. ............... 712/244 |
| 5,987,620 A | * | 11/1999 | Tran .......................... 713/600 |
| 6,065,126 A | * | 5/2000 | Tran et al. .................. 713/401 |
| 6,092,128 A | * | 7/2000 | Maas et al. ................... 710/57 |
| 6,115,807 A | * | 9/2000 | Grochowski ................ 712/212 |
| 6,519,709 B1 | * | 2/2003 | Kawauchi ................... 713/400 |

* cited by examiner

*Primary Examiner*—Christopher B. Shin
(74) *Attorney, Agent, or Firm*—Kenyon & Kenyon

(57) ABSTRACT

A system and method for substituting dynamic pipelines with static queues in a pipelined processor. The system and method are to provide a reduction in power consumption and clock distribution, as well as other advantages.

30 Claims, 7 Drawing Sheets

Simplified View of Static FIFO

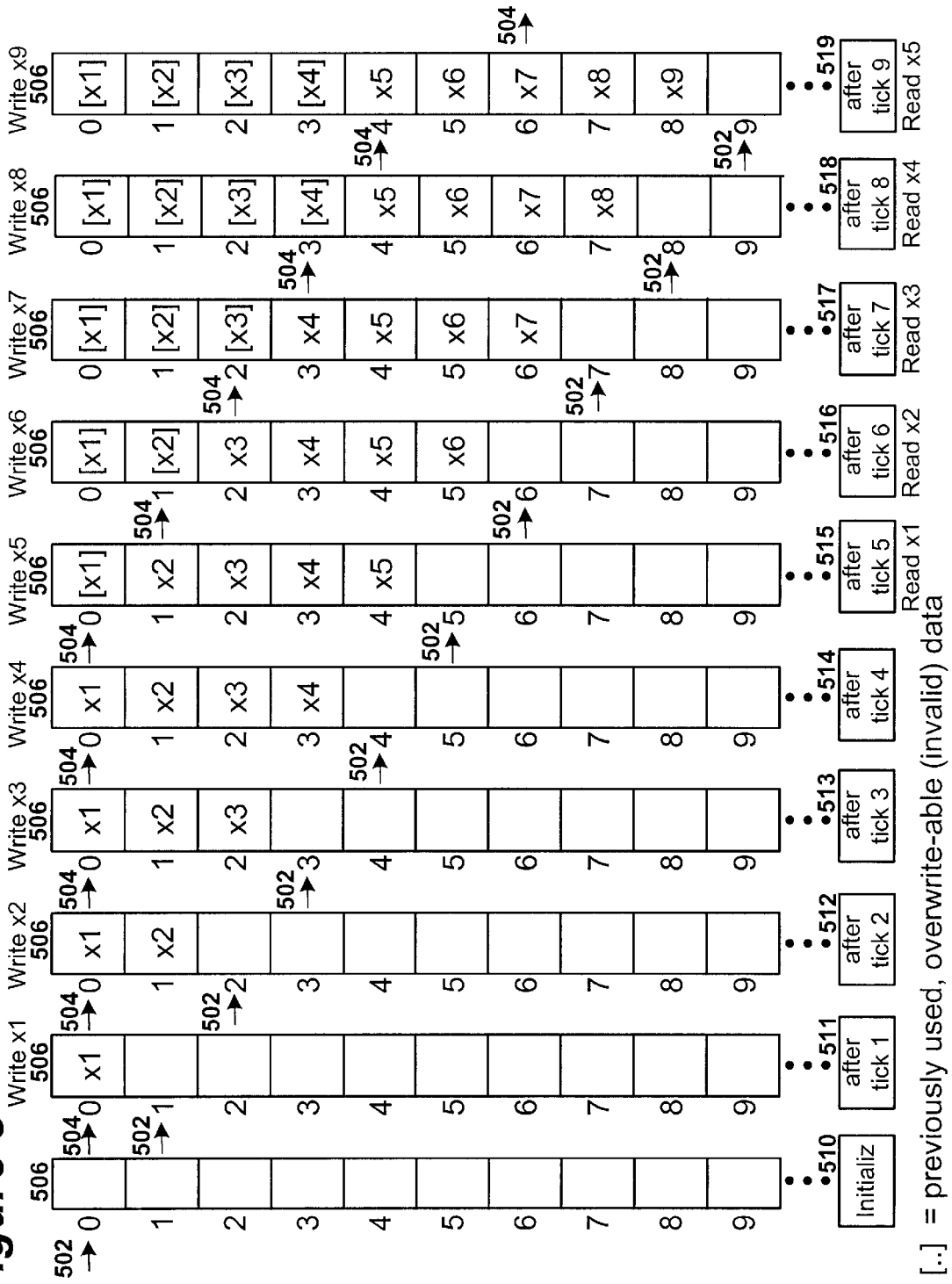

METHOD AND APPARATUS FOR UTILIZING STATIC QUEUES IN PROCESSOR STAGING

BACKGROUND INFORMATION

The present invention relates to processor data/instruction flow and storage. More specifically, the present invention relates to a system and method for substituting specific dynamic pipelines with static queues in a pipelined processor.

The architecture of many processors in the art is based on a pipelined design. A processor pipeline is analogous to an assembly line, wherein the complete task is partitioned into a sequence of small sub-steps and each sub-step is carried out at a different stage of the pipeline. The pipelined design allows the processor to simultaneously process several instructions, with each pipeline stage processing successive instructions as they pass through that stage.

When a computational task is broken down into sub-steps to be executed in a pipelined fashion, often a partial result generated at a certain stage has to travel several stages down the pipeline unchanged before it is used by another stage downstream. This process is known as 'staging'.

FIG. 1 provides an illustration of a typical staging pipeline as known in the art. In this diagram, the data, comprising four input bits 100,101,102,103, is staged down a pipeline of 5 stages 111,112,113,114,115. The number of stages of a pipeline is referred to as the "depth" ('d') of the pipeline. The number of inputs is referred to as the "width" ('w') of the pipeline.

Typical pipelined processors such as is shown in FIG. 1, although transporting data a relatively short distance, consume significant power. The power is consumed by the changes in state of each of the flip-flops 120, by the line segments 122 connecting each stage to its successor, and most significantly, by the clock grid 124.

Therefore, there is a need to improve upon the current system and method of staging pipelined processors in order to reduce power consumption and to simplify the process of clock tree design, in addition to other advantages.

BRIEF DESCRIPTION OF THE DRAWINGS

FIG. 5 provides a chart illustrative of the flow of data through a static FIFO, which is used as a substitute for a dynamic pipeline of the same parameters as provided for FIG. 1 (d=5, w=4) over a span of time under principles of the present invention.

DETAILED DESCRIPTION

It is desirable to reduce the total power consumed in the transportation of data through the processor. In one embodiment of the present invention, this is done by replacing the staging network with a 'first-in, first-out' (FIFO) queue including static elements. Such a queue, which can be implemented as static random-access memory (SRAM) or as a register file, does not require its storage elements to be clocked, and thus can lead to significant power savings. The design of the clock tree, a major task in modern processor development, is thereby simplified as well.

Figure 2:
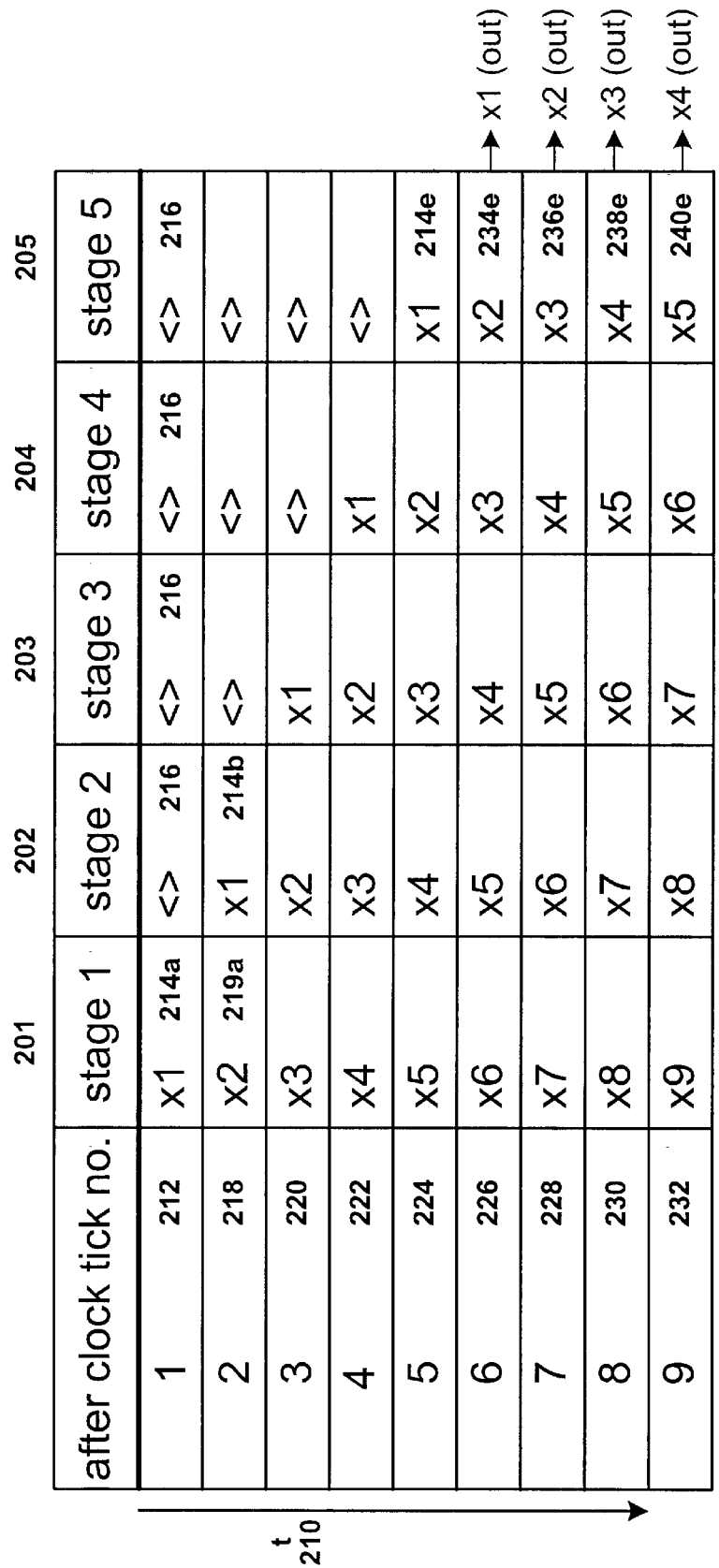
FIG. 2 provides a chart illustrative of the flow of data through a typical pipelined processor over a span of time.

FIG. 2 provides a chart illustrative of the flow of data through a typical pipelined processor over a span of time. A pipeline is presented of w=1 and d=5, whose single input is fed a sequence of bits x1, x2, x3, x4 . . . at consecutive clock ticks. The figure illustrates the content of each of the pipeline stages 201,202,203,204,205 at each clock tick (with the progression of time represented by the vertical axis 210).

The figure is interpreted as follows: After tick 1 of the clock 212, datum x1 has entered stage 1 214*a* (each of the other stages is occupied by invalid data 216). After tick 2 218, datum x1 has moved into stage 2 214*b* and datum x2 219*a* has entered stage 1, etc. Following this pattern, after 5 clock ticks 224 datum x1 214*e* appears at stage 5 205 (the output stage) and the data x2 234*e*, x3 236*e*, x4 238*e*, x5 240*e*, . . . appear at stage 5 205 after successive clock ticks 226,228,230,232, respectively.

Figure 3:
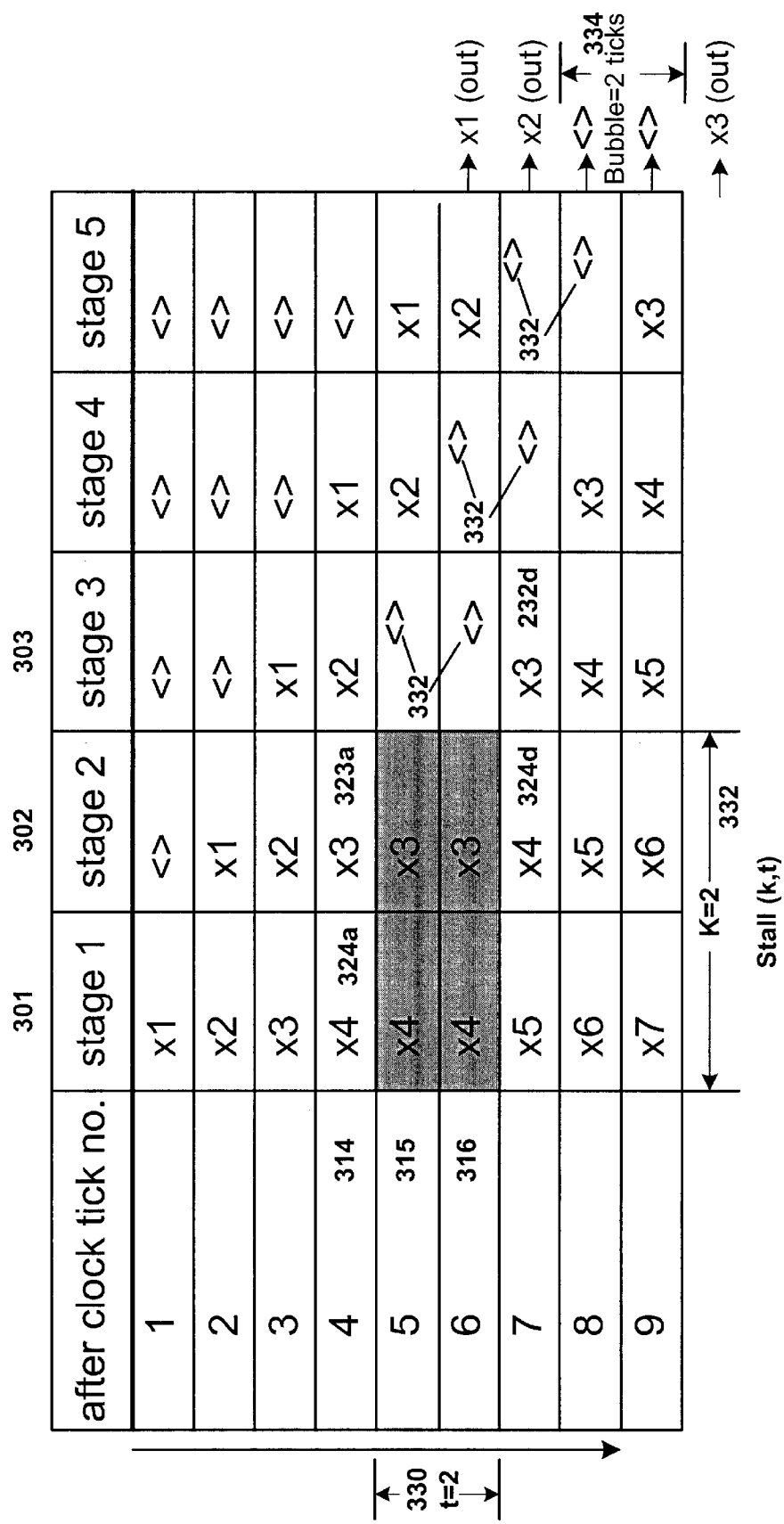
FIG. 3 provides a chart illustrative of the flow of data through a typical pipelined processor, experiencing the effect of a 'bubble'.

FIG. 3 provides a chart illustrative of the flow of data through a typical pipelined processor, experiencing the effects of a 'bubble'. Dynamic pipeline control often provides for 'flushes' and 'stalls'. A 'flush' is a signal applied to all elements of the dynamic array, which, in effect, resets them (either by actually resetting all the memory elements or by resetting a 'valid' bit which travels along with the data). A stall(k,t), where 'k' denotes a stage number and 't' denotes a number of clocks, is a more complicated condition. It is a departure from the normal flow in the pipeline, where the first k stages of the pipeline remain "frozen" for t clock ticks. This means that no new data enters the pipeline and there is no data movement in the first k stages during that time. The data initially contained in stages k+1, k+2, . . . , d continues to "drain out" of the pipeline in the normal fashion, and t "bubbles" are introduced into the pipeline.

In the situation provided in FIG. 3, stage 1 301 and stage 2 302 are 'frozen' for clock tick 5 315 and clock tick 6 316 with the values of x4 324*a* and x3 323*a* (from clock 4 314). The values are frozen for two (t=2 330) clock ticks. Two stages are frozen, stage 1 301 and stage 2 302, and therefore, k=2 332. The data, x4 324*d* and x5 323*d,* are released after tick 7 318 to their next respective stages 302,303. Because of this stall, a bubble, equal to two ticks, is formed 334.

Figure 4A:
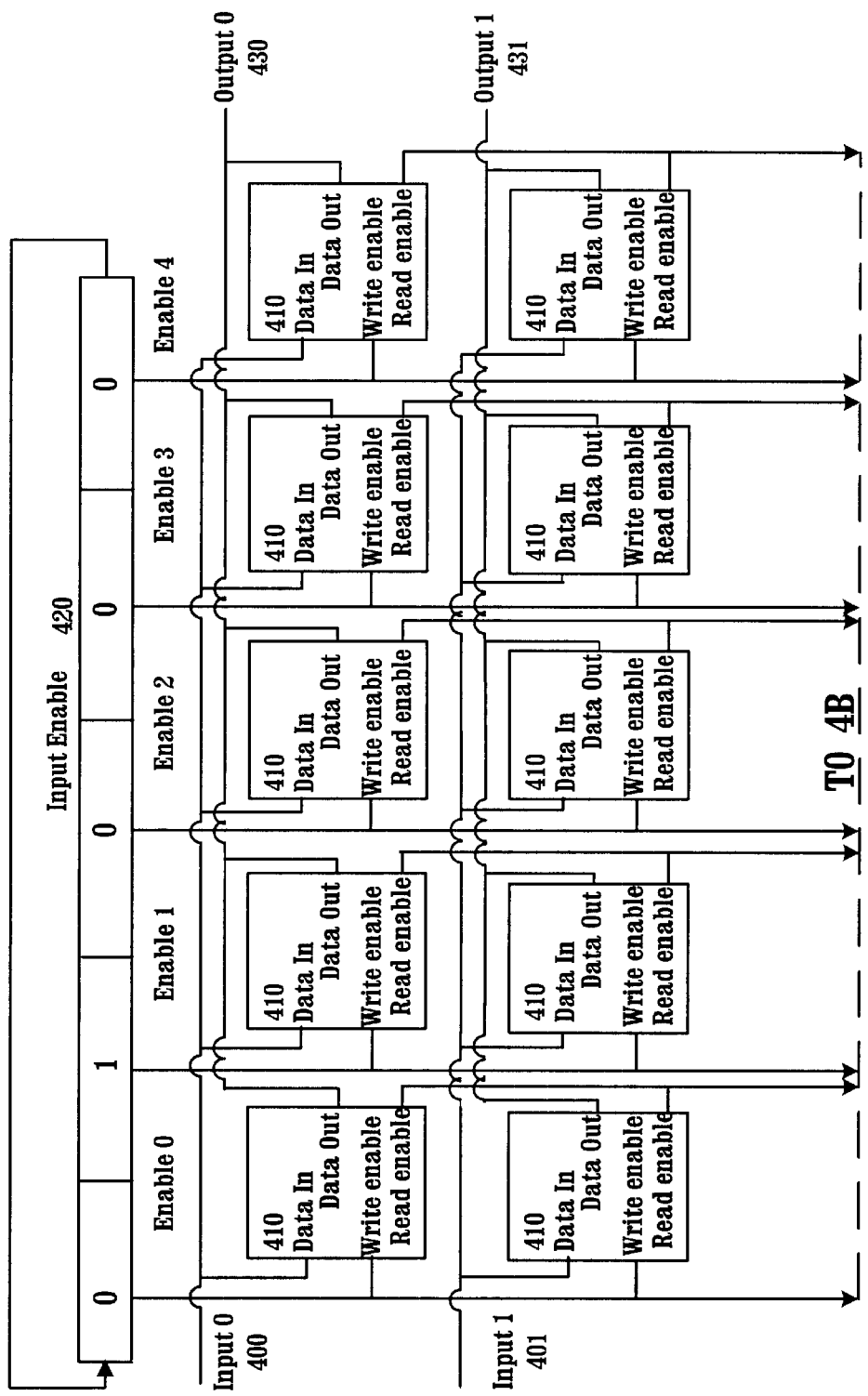
FIG. 4 illustrates a component layout of a static FIFO for processor staging under principles of the present invention.
Figure 4B:
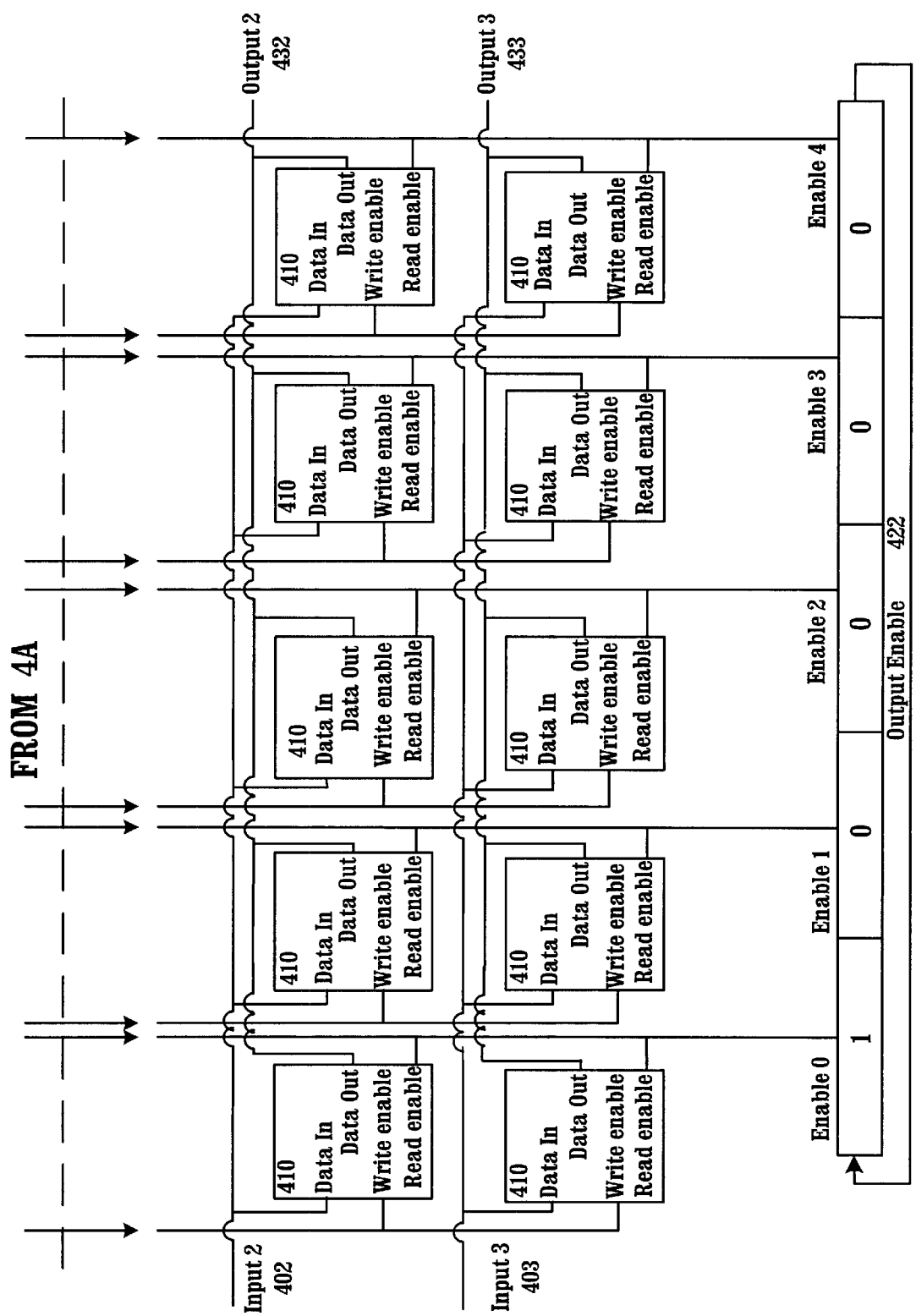

FIG. 4 provides a component layout of a static FIFO for processor staging under principles of the present invention. In one embodiment, several parallel inputs 400,401,402,403 are provided (FIG. 4 depicts a four-bit input). For each stage of the represented pipeline for each input bit 400,401,402, 403 there is a latch 410 (generally). In one embodiment, a clocking sequence is provided for input enablement. This allows for latching (writing) the appropriate input bit sequence 400,401,402,403 at the appropriate time by the correct series of latches 410. This input enablement sequencer 420 operates as the input pointer for the FIFO. In one embodiment, for each stage of the represented pipeline for each output bit 430,431,432,433 there is a latch 410. A clocking sequence is provided for output enablement. This allows for outputting (reading) the appropriate output bit sequence 430,431,432,433 at the appropriate time from the correct series of latches 410. This output enable sequencer 422 operates as the output pointer for the FIFO.

Figure 1:
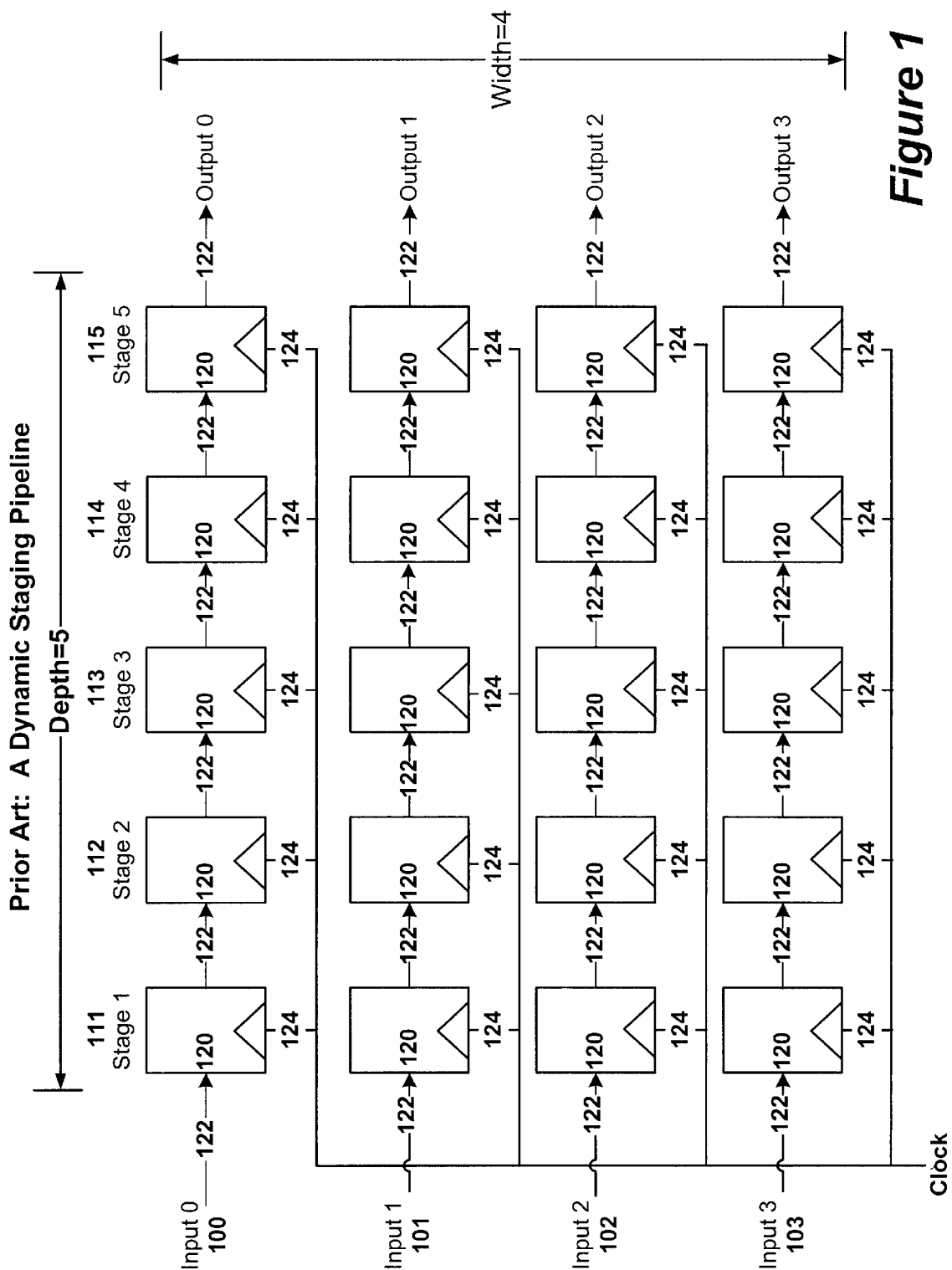
FIG. 1 provides an illustration of a typical staging pipeline as known in the art.

FIG. 5 provides a chart illustrative of the flow of data through a static FIFO, which is used as a substitute for a dynamic pipeline of the same parameters as provided for FIG. 1 (d=5, w=4) over a span of time under principles of the present invention. In one embodiment, the FIFO 506a is 'initialized' by causing the input pointer 502a and output pointer 504a to point to the '0' position of the queue 506a. In one embodiment, over the next four clock ticks 511,512, 513,514, the (four-bit) data items x1,x2,x3,x4 are written into the queue 506 ("priming the FIFO"). At each subsequent clock tick 515,516,517,518,519, the subsequent data item (x5, x6, x7, . . . ) is written into the queue 506 and the input pointer is advanced. Simultaneous with the writing of the queue 506, the queue 506 is read from the location pointed to by the output pointer 504 and the output pointer 504 is advanced.

The timing of events in the embodiment described in FIG. 5 corresponds correctly to that for the prior art (dynamic staging) system illustrated in FIG. 2. For example, after 7 ticks 517, x2 has been read (outputted), x3 is being read (stage 5), and x7 is written (inputted to stage 1). In one embodiment, the static queue(s) would be used to directly replace the dynamic pipeline(s).

In FIG. 5, for simplicity, the queue is provided as a 'semi-infinite' array, and the input 502 and output 504 pointers are always incremented following a write/read operation, respectively. In one embodiment, a finite queue is used in which the input and output pointers are incremented modulo the depth of the queue, i.e. they "wrap around" upon encountering the end of the queue. In order to simulate the action of a pipeline of depth 'd', a queue of depth 'd' is sufficient.

Figure 6:
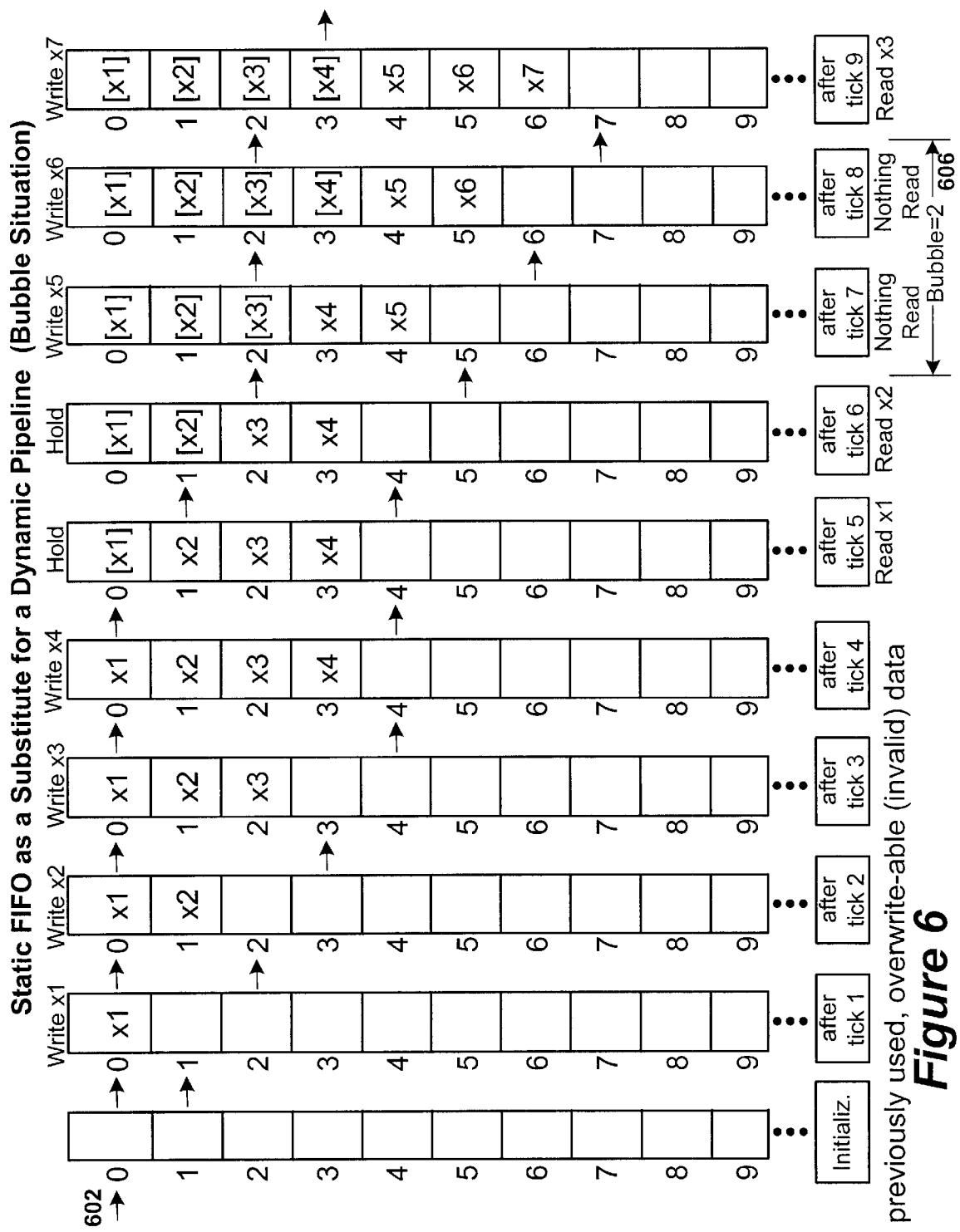
FIG. 6 provides a chart illustrative of the flow of data through a processor, utilizing a static queue as a substitute for a dynamic pipeline, experiencing the effect of a 'bubble'.

FIG. 6 provides a chart illustrative of the flow of data through a processor, utilizing a static queue as a substitute for a dynamic pipeline, experiencing the effect of a 'bubble'. In one embodiment, in order to provide the 'stalling' scheme with a FIFO, the input pointer 602 must be stalled for 't' clock ticks, while the output pointer is allowed to proceed for 'd–k' ticks and then is stall for 't' ticks. This process can be seen with reference to FIG. 6. In experiencing the same bubble (and with the same parameters) experienced in FIG. 3 by the prior art device, the FIFO substitute device returns the same result with the same timing characteristics. It is shown in FIG. 6 that, upon writing the same input as in FIG. 3 with the same timing, the same output is provided with the same timing. Further, the bubble 606 size is correct and at the correct point in time (as well as being between the correct data value reads).

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system to stage data, comprising:
a queue having a number 'd' stages, each stage to store a data value;
an input pointer to indicate an input location in the queue for an input data value;
an output pointer to indicate an output location in the queue for an output data value; wherein
at a first clocking signal, an input data value is to write into the input location currently indicated by the input pointer, and the input pointer is to point to a subsequent input location in the queue; and
at a 't'th clocking signal, if 't' is greater than or equal to 'd', an output data value is to read from the output location indicated by the output pointer, and the output pointer is to point to a subsequent output location in the queue.

2. The system of claim 1, wherein during an initialization, the input pointer points to an initial queue location, and the output pointer points to said initial queue location.

3. The system of claim 2, wherein at a stall tick, '$t_s$' ticks after said initialization, the writing of input data values ceases and the input pointer discontinues advancement to the subsequent input locations until after an additional (bubble-size) number of ticks, '$t_b$', whereupon the writing of input data values starts again and the input pointer resumes advancement to subsequent input locations.

4. The system of claim 3, wherein after '$t_s+t_b$' ticks after said initialization, the reading of output data values ceases and the output pointer discontinues advancement to the subsequent output locations until after '$t_b$' additional ticks, whereupon the reading of output data values starts again and the output pointer resumes advancement to subsequent output locations.

5. The system of claim 1, wherein the queue comprises a plurality of latches.

6. The system of claim 1, wherein the queue is a First-In, First-Out (FIFO) device.

7. The system of claim 6, wherein the queue is implemented as static random-access memory (SRAM).

8. The system of claim 6, wherein the queue is implemented as a register file.

9. The system of claim 6, wherein the FIFO device is incorporated within a processor.

10. The system of claim 6, wherein each data value is expressed by a 32-bit sequence.

11. A method to stage data, comprising:
storing by a queue having a number 'd' stages, each stage storing a data value;
indicating, by an input pointer, an input location in the queue for an input data value;
indicating, by an output pointer, an output location in the queue for an output data value;
writing, at a first clocking signal, an input data value, into the input location currently indicated by the input pointer, and the input pointer is to point to a subsequent input location in the queue; and
reading, at a 't'th clocking signal, if 't' is greater than or equal to 'd', an output data value from the output location pointed to by the output pointer, and the output pointer is to point to a subsequent output location in the queue.

12. The method of claim 11, wherein during an initialization, the input pointer points to an initial queue location, and the output pointer points to said initial queue location.

13. The method of claim 12, wherein at a stall tick, '$t_s$' ticks after said initialization, the writing of input data values ceases and the input pointer discontinues advancement to the subsequent input locations until after an additional (bubble-size) number of ticks, '$t_b$', whereupon the writing of input data values starts again and the input pointer resumes advancement to subsequent input locations.

14. The method of claim 13, wherein after '$t_s+t_b$' ticks after said initialization, the reading of output data values ceases and the output pointer discontinues advancement to the subsequent output locations until after '$t_b$' additional ticks, whereupon the reading of output data values starts again and the output pointer resumes advancement to subsequent output locations.

15. The system of claim 11, wherein the queue comprises a plurality of latches.

16. The method of claim 11, wherein the queue is a First-In, First-Out (FIFO) device.

17. The system of claim 16, wherein the queue is implemented as static random-access memory (SRAM).

18. The system of claim 16, wherein the queue is implemented as a register file.

19. The method of claim 16, wherein the FIFO device is incorporated within a processor.

20. The method of claim 16, wherein each data value is expressed by a 32-bit sequence.

21. A queue having a number 'd' stages, each stage to store a data value, comprising:
   an input pointer to indicate an input location in the queue for an input data value;
   an output pointer to indicate an output location in the queue for an output data value; wherein
   at a first clocking signal, an input data value is to write into the input location currently indicated by the input pointer, and the input pointer is to point to a subsequent input location in the queue; and
   at a 't'th clocking signal, if 't' is greater than or equal to 'd', an output data value is to read from the output location indicated by the output pointer, and the output pointer is to point to a subsequent output location in the queue.

22. The queue of claim 21, wherein during an initialization, the input pointer points to an initial queue location, and the output pointer points to said initial queue location.

23. The queue of claim 22, wherein at a stall tick, '$t_s$' ticks after said initialization, the writing of input data values ceases and the input pointer discontinues advancement to the subsequent input locations until after an additional (bubble-size) number of ticks, '$t_b$', whereupon the writing of input data values starts again and the input pointer resumes advancement to subsequent input locations.

24. The queue of claim 23, wherein after '$t_s+t_b$' ticks after said initialization, the reading of output data values ceases and the output pointer discontinues advancement to the subsequent output locations until after '$t_b$' additional ticks, whereupon the reading of output data values starts again and the output pointer resumes advancement to subsequent output locations.

25. The queue of claim 21, wherein the queue comprises a plurality of latches.

26. The queue of claim 21, wherein the queue is a First-In, First-Out (FIFO) device.

27. The queue of claim 26, wherein the queue is implemented as static random-access memory (SRAM).

28. The queue of claim 26, wherein the queue is implemented as a register file.

29. The queue of claim 26, wherein the FIFO device is incorporated within a processor.

30. The queue of claim 26, wherein each data value is expressed by a 32-bit sequence.

* * * * *